(12) United States Patent
Schülling

(10) Patent No.: US 7,270,530 B2
(45) Date of Patent: Sep. 18, 2007

(54) PORTIONING DEVICE FOR FOODSTUFFS

(75) Inventor: Christof Schülling, Sand/Main (DE)

(73) Assignee: Bernd Lölsberg, Kürnach (DE)

( * ) Notice: Subject to any disclaimer, the term of this patent is extended or adjusted under 35 U.S.C. 154(b) by 47 days.

(21) Appl. No.: 10/491,739

(22) PCT Filed: Oct. 4, 2002

(86) PCT No.: PCT/DE02/03754

§ 371 (c)(1),
(2), (4) Date: Aug. 13, 2004

(87) PCT Pub. No.: WO03/032745

PCT Pub. Date: Apr. 24, 2003

(65) Prior Publication Data

US 2005/0000372 A1 Jan. 6, 2005

(30) Foreign Application Priority Data

Oct. 6, 2001 (DE) .................. 101 49 509

(51) Int. Cl.
*A23G 9/28* (2006.01)
(52) U.S. Cl. ............... 425/187; 425/221; 425/276; 425/285; 222/38
(58) Field of Classification Search ............... 425/169, 425/173, 187, 221, 276–286; 222/38
See application file for complete search history.

(56) References Cited

U.S. PATENT DOCUMENTS 525,382 A * 9/1894 Baughman .................. 425/284
2,715,175 A * 8/1955 Jacobson .................... 425/282
5,000,672 A 3/1991 Halimi
5,044,914 A * 9/1991 Schulling ................... 425/169
6,474,974 B1 * 11/2002 Horng ........................ 425/283

FOREIGN PATENT DOCUMENTS

| BE | 472 274 A | 5/1947 |
| BE | 1010281 A7 | 5/1998 |
| DE | 23 64 957 | 7/1975 |
| DE | 82 10 658.4 U1 | 7/1982 |
| DE | 36 22 034 A1 | 1/1988 |
| DE | 37 22 822 A1 | 1/1989 |

(Continued)

OTHER PUBLICATIONS

English Abstract for DE 41 26 560, published on Feb. 1993.*

*Primary Examiner*—James P. Mackey
*Assistant Examiner*—Dimple Bodawala
(74) *Attorney, Agent, or Firm*—McCormick, Paulding & Huber LLP

(57) ABSTRACT

The invention relates to a portioning device for foodstuffs, in particular ice cream. Said device comprises a handle consisting of two handle halves that are interconnected by an articulation and can be pivoted in relation to one another, a scoop that is attached to said handle and a blade that is adapted to the interior shape of the scoop. Said blade is mounted so that it can pivot close to the surface of said scoop and carries out a pivoting displacement when the handle is operated. The handle is equipped, between the articulation and the scoop, preferably in the vicinity of the articulation, with a resilient pad consisting of an elastic material, preferably a rubber ring.

12 Claims, 1 Drawing Sheet

FOREIGN PATENT DOCUMENTS

| | | |
|---|---|---|
| DE | 41 26 560 A1 * | 2/1993 |
| DE | 200 16 217 U1 | 1/2001 |
| EP | 0 053 988 A2 | 6/1982 |
| EP | 0 819 403 A2 | 1/1998 |
| GB | 174821 | 2/1922 |
| GB | 1 343 123 | 1/1974 |
| GB | 2 313 290 A | 11/1997 |

* cited by examiner

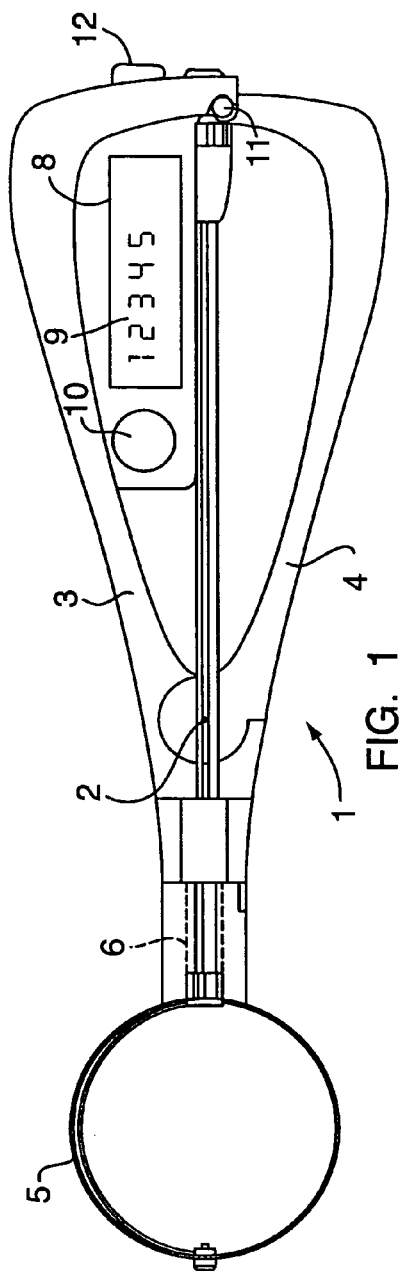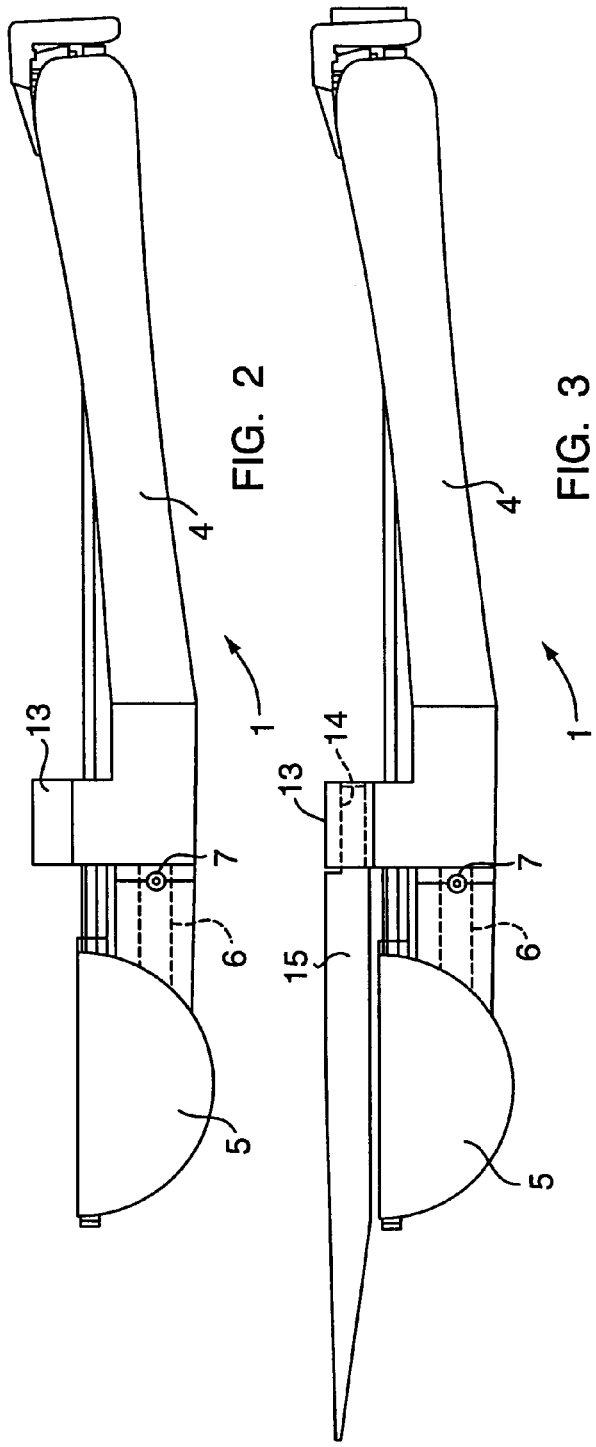

PORTIONING DEVICE FOR FOODSTUFFS

CROSS-REFERENCE TO RELATED APPLICATIONS

This application is entitled to the benefit of and incorporates by reference essential subject matter disclosed in International Patent Application No. PCT/DE02/03754 filed on Oct. 4, 2002 and German Patent Application No. 10149509.9 filed on Oct. 6, 2001.

FIELD OF THE INVENTION

The invention pertains to a device for portioning foods, particularly ice cream, with a handle in the form of two handle halves that are connected by means of an articulation and can be pivoted relative to one another, with a scoop that is fixed on the handle, and with a blade that is adapted to the shape of the inner side of the scoop, wherein said blade is arranged such that it can be pivoted close to the scoop surface and carries out a pivoting movement when the handle is actuated. The invention also pertains to a method for dispensing spherically shaped servings.

BACKGROUND OF THE INVENTION

Portioning devices are used in the food industry in order to portion food servings, particularly spherically shaped servings of ice cream. In this case, the food or ice cream is removed from the storage receptacle with the scoop of the portioning device, and the spherically shaped serving is then placed on a plate, in a bowl or on an ice cream cone. The food is separated from the scoop of the portioning device with the aid of a blade that is arranged very close to the inner surface of the scoop. When the two handle halves are pressed together, this blade is pivoted along the inner side of the scoop such that the food or ice cream is separated therefrom.

After each handling of the portioning device, it is subjected to a cleaning process that frequently consists of placing the apparatus into a water container and, if so required, stirring the portioning device back and forth. It is common practice to remove the drops of rinsing water from the scoop of the portioning device before it is used again. For this purpose, the scoop of the portioning device is usually wiped off with a cloth or sponge. However, this removal of the rinsing water is not only carried out for hygienic reasons. When removing ice cream from the storage receptacle, water drops adhering to the scoop should also be prevented from crystallizing into ice which can negatively affect the consistency and the taste of the ice cream.

The customary practice of wiping off the rinsing water adhering to the portioning device is not a truly hygienic measure anyhow. The rinsing water absorbed by the cloth or sponge and the food remains form an ideal nutrient medium for bacteria. The bacteria are then transferred to the scoop and the foods being served with this scoop. With respect to hygienic aspects, the portioning devices according to the state of the art, as well as their function and operation, are not only highly questionable, but may also be in breach of the pertinent regulations of the hygiene law.

When operating manual portioning devices, a certain expenditure of force is required in order to press together the two handle halves. The exerted force serves for overcoming the pull-back spring in the handle, for overcoming the friction and for separating the food from the scoop. This expenditure of force is justifiable if the portioning device is only used occasionally. However, the monotonous load resulting from the constant operation of the portioning device subjects the hand and arm of the user to a significant stress. In this context, it is particularly important to realize the two handle halves of the portioning device ergonomically. Portioning devices according to the state of the art only provide inadequate solutions in this respect.

Another problem in the utilization of manual portioning devices is that the actually sold quantity of spherically shaped servings normally cannot be determined. Especially if the portioning device is used for ice cream, the large quantities of actually dispensed ice cream scoops on hot days usually can only be estimated. Since the ice cream vendor and the business owner occasionally are not same person, there is an inherent risk of fraud in the settlement of accounts between the vendor and the business owner.

In the light of these circumstances, the invention aims to further develop portioning devices for foods, particularly ice cream, in such a way that the previously described disadvantages are eliminated and the handling and effectiveness of the portioning device with respect to the dispensing of spherically shaped servings are improved. In addition, the invention also aims to disclose a method for dispensing spherically shaped food servings.

SUMMARY OF THE INVENTION

According to the invention, these objectives are attained with several independent measures. With respect to the portioning device, the invention proposes that

- the handle is equipped, particularly in the region of the articulation, with a buffer of an elastic material, preferably a rubber ring and/or
- a means for limiting the handle width assumed by the two handle halves in the idle state of the portioning device and/or
- a counting mechanism that counts the relative pivoting movements between the two handle halves which occur a certain time interval after the respectively preceding pivoting movement, wherein this time interval is longer than/identical to a predetermined minimum time interval.

The invention proposes that the method comprises the following steps:
a) removing the serving from the storage receptacle
b) dispensing the serving to the consumer
c) placing the portioning device into a container filled with water
d) if so required, stirring the portioning device back and forth in the water
e) removing the portioning device from said container
f) striking the portioning device against a solid structure, preferably the edge of the sink used for the cleaning process, with the buffer of elastic material
g) continuing the method with step a).

A first embodiment of the portioning device is based on manually operated portioning devices according to the state of the art. In contrast to known portioning devices, this embodiment comprises a handle that is equipped with a buffer of elastic material between the articulation and the scoop—preferably in the region of the articulation. The buffer preferably is realized in the form of a rubber ring that encompasses the handle in the region of the articulation and is rigidly connected to the handle.

Simpler portioning devices with a one-piece handle, i.e., a handle that is not composed of two handle halves, can also be equipped with a buffer of elastic material. In portioning devices of this type, the scoop is directly fixed on the one-piece handle. These portioning devices are used like scrapers, i.e., the scoop is immersed into the ice cream and filled by carrying out an essentially tangential movement. The buffer of elastic material, preferably a rubber ring, also provides certain advantages in portioning devices of this type. With respect to the proposed buffer of elastic material, both types of portioning devices are handled in the same fashion.

A thusly designed portioning device is advantageously used in the proposed method for dispensing spherically shaped servings. According to this method, the portioning device is, after dispensing the spherically shaped servings, initially placed into a container filled with water. This measure serves for removing food remains—particularly remains of ice cream—from the portioning device. At the beginning of the next portioning process, the vendor, if so required, stirs the portioning device back and forth in the water a few times. After removing the portioning device from the rinsing water, the vendor repeatedly strikes the portioning device against a solid structure with the buffer of elastic material. This causes adhering drops of rinsing water to be removed from the portioning device such that it is free of rinsing water during the subsequent dispensing of spherically shaped servings. Any solid structure, in principle, may be used for this purpose. However, it is practical to strike the portioning device against the edge of the sink, into which the used portioning device is placed. This causes residual droplets being removed to drop into the sink.

The customary practice of removing residual rinsing water with a cloth or sponge is eliminated with the portioning device according to the present invention. This means that the risk of contaminating the portioning device with bacteria is precluded. Consequently, the proposed design of the portioning device provides significant advantages with respect to hygienic considerations.

The handling of a portioning device of the above-described design can be further improved with a means for limiting the handle width assumed by both handle halves. The operation of a manual portioning device for dispensing ice cream on hot days is a quite laborious job. The repeated procedure of removing the ice cream from the storage receptacle with the scoop of the portioning device and dispensing the spherically shaped servings by pressing together the two handle halves subjects the fingers and arm muscles to significant stresses.

In order to reduce these stresses an ergonomic handle design is required. The proposed limitation of the handle width represents such a measure and makes it possible to exactly adapt the portioning device to the individual dimensions of the vendor's hand. This results in the advantage that the portioning device can be handled in a largely fatigue-free fashion.

In one special embodiment of a portioning device with limited handle width, the pivoting range of the handle halves is limited to a maximum value. This can be easily realized with a suitably arranged set screw that defines the aforementioned maximum value. The handle width and the hand size of the user can be adapted to one another in this fashion.

In another embodiment that serves for attaining the same objective, handle sleeves can be attached to the handle halves. The respective user is able to choose between sleeves with a different thickness. The handle width to be encompassed by the hand and the fingers can also be varied in this fashion in order to advantageously reduce the stresses, to which the corresponding muscles are subjected. Sleeves of varying thickness can be expressly utilized in connection with portioning devices that have a handle consisting of two handle halves or in connection with portioning devices that have a one-piece handle, are used like a scraper and in which the scoop is directly fixed on the one-piece handle.

In the context of the invention, the term "handle sleeve" has a broad meaning because it not only covers sleeves in the form of closed hollow cylinders, but also shells that, per definition, are slotted along the longitudinal side. The sleeve or the shell can be respectively placed over and/or attached to the handle or handle half and is then fixed in position. Shells can be fixed in position by radially pressing against the handle or handle half. If elastic materials are used, they can also be fixed in position with a snap-in mechanism, i.e., a clamping effect. Snap-in mechanisms or locking mechanisms may be considered for fixing the shells as well as the sleeves in position.

The proposed constructive measures for additionally developing portioning devices also comprise a counting mechanism for determining the number of spherically shaped servings dispensed. According to the present invention, this is realized by counting the pivoting movements of one handle half relative to the other handle half when the handle is pressed together. Magnets are typically utilized as pulse generators in this case. However, it would also be possible to utilize any other type of pulse generation for the method according to the invention.

In order to largely preclude the counting of pivoting movements that do not result in the dispensing of spherically shaped servings, e.g., when the handle is repeatedly pressed together during the dispensing of a stubbornly adhering spherically shaped serving or when the device is cleaned, the proposed counter according to an further development of the invention is coupled to a time switch. This time switch is started anew each time the handle is pressed together and only causes those handle movements to be counted which occur a certain minimum time interval after the respectively preceding handle movement. This minimum time interval can be predetermined by the user such that individual work habits can be taken into account.

The counter in connection with the time switch ensures the suppression of counting pulses that are generated in such rapid succession that it would be impossible to fill the scoop and to dispense a spherically shaped serving. The count of the counter consequently reflects the exact number of spherically shaped servings sold.

Further developments of the invention pertain to the design of the counter.

In one preferred embodiment of the portioning device according to the present invention, a counter is used that determines the servings sold to one person. The counting process may include the number of servings, as well as their equivalent value in the corresponding currency. The counting mechanism according to the invention is equipped with a corresponding input device for inputting the appropriate price for one spherically shaped serving. In this embodiment, the vendor is provided with information on the number of spherically shaped servings as well as their price after each sale. In another embodiment, the servings sold per day are output alternatively or additionally. In this case, it is also possible to output the number of servings sold, as well as their price.

While the applicable numbers for each sale are primarily interesting for the vendor, the latter numbers are particularly interesting for the business owner. The different interests of the vendor and the business owner are also taken into account with a corresponding design of the display.

The invention thus proposes a display that can be viewed by the vendor in order to output the number of servings sold to one person. This display can be reset to zero by actuating a resetting device that may consist, in particular, of a button. The display preferably is reset each time a sale for which one particular person is paying has been completed.

However, the vendor is unable to ascertain the number of servings that are sold per day and determined by the counting mechanism. According to the invention, these numbers can be retrieved with an attachable inquiry unit or by providing the display with a cover that can be locked. Both variations ensure that only authorized persons have access to the aforementioned sales numbers. Analogous to the display of the applicable numbers per sale, the display for the daily sales can also be reset by pressing a button.

In another embodiment of the invention, the handle of the portioning device is equipped with a means for accommodating a spatula. This means may simply consist of a sleeve that serves for inserting the spatula handle and is arranged on the handle. When using the portioning device for ice cream, the spatula primarily serves for smoothing the ice cream within certain time intervals, namely each time the scoop of the portioning device has excessively cleaved the surface of the ice cream. This is required, in particular, after dosing time in order to present the ice cream in a correspondingly appetizing fashion on the next day.

It is practical to integrate the receptacle for the spatula in the above-described buffer arranged in the region of the handle articulation. This receptacle may be positioned, in principle, above or underneath the portioning device. However, it is recommended to arrange this receptacle above the portioning device because this prevents the receptacle from filling with ice cream while the servings are removed from the storage receptacle. Analogous to the portioning device, the spatula is placed into a container filled with water after each use for cleaning purposes.

In practical applications, it has proved advantageous to utilize the portioning device for servings of different sizes. Consequently, the proposed portioning device is provided with constructive measures that make it possible to remove and replace the scoop with another scoop of a different size. According to one simple solution to the problem, the scoop of the portioning device is provided with a square that is inserted into a corresponding receptacle of the handle part and fixed in position with a screw.

The invention proposes to utilize two-component injection molding for manufacturing the previously described portioning device. In this case, the portioning device consists of a hard inner component, i.e., a component that is situated in the region near the center and thus contributes to the stability and rigidity of the portioning device, and a soft outer component that comes in contact with and adapts itself to the hand. This advantageously results in a significantly improved operating comfort.

BRIEF DESCRIPTION OF THE DRAWINGS

Other details, characteristics and advantages of the invention are discussed in the following section of the description. In this section, embodiments of the portioning device according to the invention are described in greater detail with reference to the figures. The respective figures show a portioning device with:

FIG. 1 shows a counting mechanism;

FIG. 2 shows a buffer of elastic material, and

FIG. 3 shows an attached spatula.

DETAILED DESCRIPTION OF THE PREFERRED EMBODIMENTS

FIG. 1 shows the basic design of a manual portioning device. This portioning device comprises a handle 1 consisting of two handle halves 3, 4 that are connected to one another in a pivotable fashion at the articulation 2, wherein the handle is provided with a scoop 5 on one of its ends. In this embodiment, the scoop 5 can be exchanged. The scoop is inserted into a correspondingly designed bushing on the handle 1 with a square 6 and fixed in position with an Allen screw 7. In the embodiment shown, a counter 8 with a display 9 for the number of servings sold per day is integrated into one handle half 3. Depending on its designated function, the display 9 may be covered with a lockable cover that, however, is detached from the portioning device shown in the figure. The lock for the cover is indicated with the reference symbol 10. The counter is coupled to a magnet 11 that is recessed into the other handle half 4 and generates a counting pulse each time the handle halves 3, 4 are pivoted toward one another. This figure does not show the time switch that cooperates with the counter and ensures that only those handle movements are counted which occur a certain minimum time interval after the respectively preceding handle movement. The display can be reset to zero by pressing the button 12.

FIG. 2 shows a side view of the portioning device with the buffer 13 of elastic material. The buffer serves as a noise and shock absorber when striking the portioning device on a solid structure after it is removed from the rinsing water. Drops of rinsing water that adhere to the portioning device can be effectively removed by repeatedly striking the portioning device against a solid structure, for example, the edge of a sink. This means that hygienically questionable sponges for removing the water drops are no longer required.

According to FIG. 3, the buffer 13 also contains a sleeve 14 for inserting a spatula 15. The spatula is used, in particular, after dosing time in order to smooth the surface of the ice cream situated in the storage receptacle which was cleaved due to the constant removal of ice cream.

The constructive measures according to the present invention result in a significantly improved handling and effectiveness of the portioning device during the dispensing of spherically shaped servings.

The invention claimed is:

1. A portioning device for foods, particularly ice cream, comprising:

a handle in the form of two handle halves that are connected by means of an articulation and can be pivoted relative to one another, a scoop that is fixed on the handle, and a blade that is adapted to the shape of the inner side of the scoop, wherein the blade is arranged in a pivotable fashion close to the surface of the scoop and carries out a pivoting movement when the handle is actuated, and wherein the handle is equipped with a buffer of elastic material comprising a rubber ring between the articulation and the scoop generally in the region of the articulation.

2. A method for portioning foods, particularly ice cream, by utilizing a portioning device according to claim 1, wherein the method comprises the following steps:

a) removing a serving from a storage receptacle using the portioning device;

b) dispensing the serving to the consumer;

c) placing the portioning device into a container filled with water;
d) cleaning the portioning device in the water;
e) removing the portioning device from said container;
f) striking the portioning device against a solid structure with the buffer of elastic material; and
g) continuing the method with step a).

3. The portioning device for foods, particularly ice cream, according to claim 1, wherein
handle sleeves can be placed over the handle or handle halves, and in that the user is able to choose from handle sleeves having varying thickness.

4. The portioning device for foods, particularly ice cream, according to claim 3, wherein the handle sleeves are realized in the form of peripherally closed sleeves, wherein the closed sleeves are respectively placed over the handle or handle half.

5. The portioning device for foods, particularly ice cream, according to claim 1, further comprising:
a spatula attached to the handle.

6. The portioning device for foods, particularly ice cream, according to claim 1, wherein
the scoop can be exchanged with other scoops of a different size.

7. The portioning device for foods, particularly ice cream, according to claim 1, wherein the portioning device is manufactured by means of two-component injection molding, namely with a hard component in the inner region near the center and a soft outer component.

8. The portioning device for foods, particularly ice cream, according to claim 4, wherein the closed sleeves are respectively attached to the handle or handle half.

9. The portioning device for foods, particularly ice cream, according to claim 8, wherein the closed sleeves are respectively fixedly attached to the handle or handle half by means of a locking mechanism.

10. The portioning device for foods, particularly ice cream, according to claim 3, wherein the handle sleeves are realized in the form of shells that are open along one longitudinal side, wherein the shells are respectively placed over the handle or handle half.

11. The portioning device for foods, particularly ice cream, according to claim 10, wherein the shells are respectively attached to the handle or handle half.

12. The portioning device for foods, particularly ice cream, according to claim 11, wherein the shells are respectively fixedly attached to the handle or handle half by means of a locking mechanism.

* * * * *